United States Patent
Lee et al.

(10) Patent No.: US 12,206,158 B2
(45) Date of Patent: Jan. 21, 2025

(54) ELECTRONIC DEVICE

(71) Applicant: Samsung Display Co., Ltd., Yongin-Si (KR)

(72) Inventors: Hyun Jae Lee, Seongnam-si (KR); Sunghwan Kim, Ulsan (KR)

(73) Assignee: Samsung Display Co., Ltd., Yongin-Si (KR)

( * ) Notice: Subject to any disclaimer, the term of this patent is extended or adjusted under 35 U.S.C. 154(b) by 209 days.

(21) Appl. No.: 17/866,428

(22) Filed: Jul. 15, 2022

(65) Prior Publication Data

US 2023/0208011 A1   Jun. 29, 2023

(30) Foreign Application Priority Data

Dec. 23, 2021  (KR) .................. 10-2021-0186184

(51) Int. Cl.
*H01Q 1/24*    (2006.01)
*G06F 1/16*    (2006.01)

(52) U.S. Cl.
CPC ........... *H01Q 1/243* (2013.01); *G06F 1/1652* (2013.01)

(58) Field of Classification Search
CPC .......... H01Q 1/243; H01Q 1/364; H01Q 1/38; H01Q 21/08; H01Q 1/24; H01Q 1/50; G06F 1/1652; G09F 9/301; G09F 9/30; H05K 1/111
See application file for complete search history.

(56) References Cited

U.S. PATENT DOCUMENTS

| | | | |
|---|---|---|---|
| 9,075,244 B2 | 7/2015 | Song et al. | |
| 10,990,234 B2 | 4/2021 | Kim et al. | |
| 2016/0190678 A1 | 6/2016 | Hong et al. | |
| 2019/0206898 A1 | 7/2019 | Baek | |
| 2020/0403315 A1* | 12/2020 | Huh | H01Q 9/0407 |
| 2021/0336356 A1* | 10/2021 | Choi | G06F 1/1652 |
| 2022/0200132 A1* | 6/2022 | Oh | H01Q 9/0407 |

FOREIGN PATENT DOCUMENTS

| | | | |
|---|---|---|---|
| KR | 10-2016-0080444 A | 7/2016 | |
| KR | 10-2018-0101064 A | 9/2018 | |
| KR | 10-1930298 B1 | 12/2018 | |
| KR | 10-2019-0082338 A | 7/2019 | |
| KR | 10-2009382 B1 | 8/2019 | |
| KR | 10-2093717 B1 | 3/2020 | |
| KR | 10-2020-0112793 A | 10/2020 | |
| KR | 10-2020-0143328 A | 12/2020 | |
| WO | WO-2021049908 A1 * | 3/2021 | ............ H01Q 1/085 |

* cited by examiner

*Primary Examiner* — Seung H Lee
(74) *Attorney, Agent, or Firm* — Innovation Counsel LLP

(57) ABSTRACT

An electronic device includes a display panel, an antenna, and a circuit film. The antenna overlaps the display panel. The antenna includes an antenna base film having a first surface and a second surface opposite each other. The first surface is disposed between the display panel and the second surface. The antenna further includes an antenna pattern, an antenna feed line, and an antenna pad each being disposed on the first surface. The antenna pattern is electrically connected through the antenna feed line to the antenna pad. The circuit film is electrically connected to the antenna pad.

32 Claims, 16 Drawing Sheets

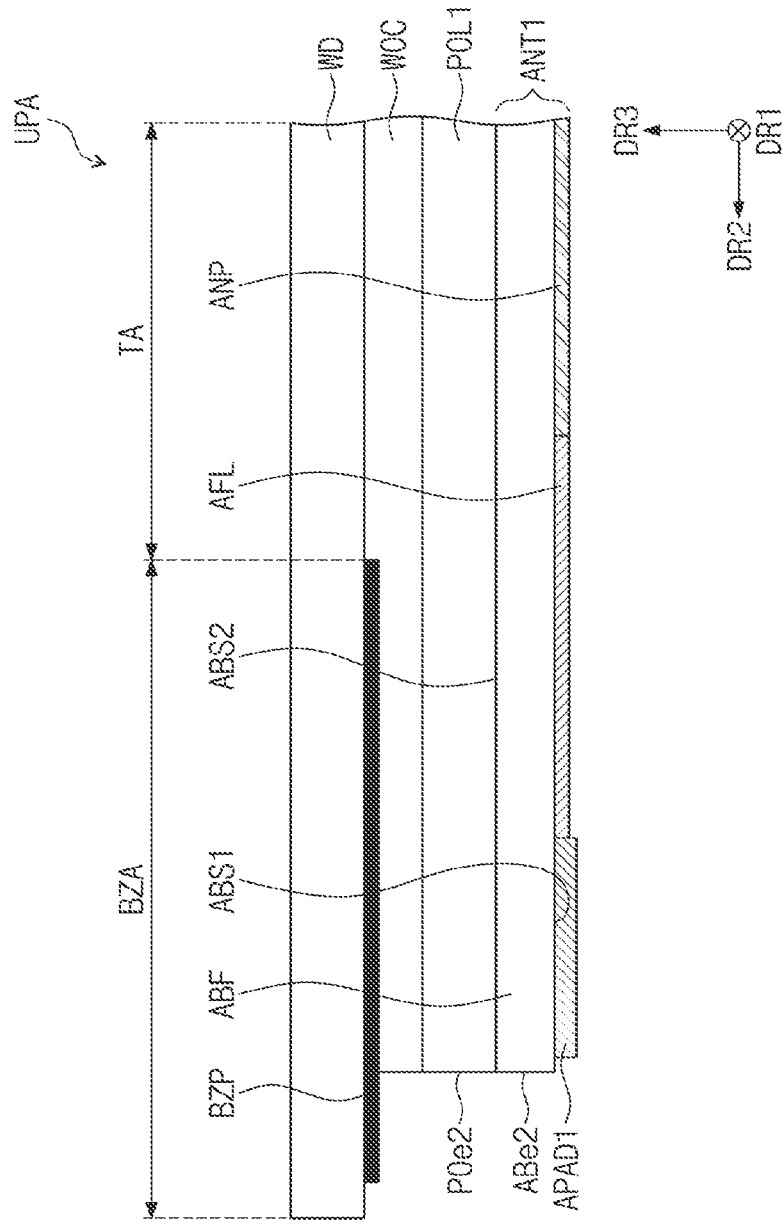

ELECTRONIC DEVICE

CROSS-REFERENCE TO RELATED APPLICATION(S)

This application claims priority under 35 U.S.C. § 119 to Korean Patent Application No. 10-2021-0186184 filed on Dec. 23, 2021 in the Korean Intellectual Property Office; the Korean Patent Application is incorporated by reference.

BACKGROUND

The technical field is related to an electronic device capable of communication.

An electronic device that supports wireless communication may include an antenna. The antenna may transmit and receive signals in a specific frequency range, may be formed of a metallic material, and may be disposed inside the electronic device or form the exterior of the electronic device. The electronic device may include multiple antennas for wireless communication.

SUMMARY

Embodiments may be related to an electronic device capable of communication.

An embodiment may be related to an electronic device. The electronic device may include a display panel, an antenna, and a circuit film. The antenna may overlap the display panel. The antenna may include an antenna base film having a first surface and a second surface opposite each other. The first surface may be disposed between the display panel and the second surface. The antenna may further include an antenna pattern, an antenna feed line, and an antenna pad each being disposed on the first surface. The antenna pattern may be electrically connected through the antenna feed line to the antenna pad. The circuit film may be electrically connected to the antenna pad.

The electronic device may include the following elements: a first adhesive layer disposed between the display panel and the antenna; and a second adhesive layer disposed between the first adhesive layer and the display panel. The first adhesive layer and the second adhesive layer may be attached to each other.

A dielectric constant of the first adhesive layer may be lower than a dielectric constant of the second adhesive layer.

A loss value of the first adhesive layer may be lower than a loss value of the second adhesive layer.

The first adhesive layer may cover a face of the antenna pattern, may cover at least half of a face of the antenna feed line, and may not overlap the antenna pad in a direction perpendicular to the first surface. The second adhesive layer may overlap each of the antenna pattern, the antenna feed line, and the antenna pad in the direction perpendicular to the first surface. The circuit film may be partially disposed between a portion of the second adhesive layer and the antenna pad.

The first adhesive layer may be shorter than the second adhesive layer in a direction parallel to the first surface.

The electronic device may include the following elements: an anti-reflection film overlapping the antenna; a window overlapping the anti-reflection film; and a bezel pattern disposed on the window. The antenna pad may overlap the bezel pattern.

An edge of the antenna base film, an edge of the anti-reflection film, and an edge of the display panel may be aligned with one another in a cross-sectional view of the electronic device.

The antenna base film may protrude beyond an edge of the anti-reflection film in a direction parallel to the first surface. The antenna pad may not overlap the anti-reflection film in a direction perpendicular to the first surface.

An edge of the antenna base film and an edge of the anti-reflection film may be aligned with each other in a cross-sectional view of the electronic device. Each of the antenna base film and the anti-reflection film may protrude beyond an edge of the display panel in a direction parallel to the first surface. The antenna pad and a portion of the anti-reflection film may not overlap the display panel in a direction perpendicular to the first surface.

The electronic device may include a window disposed between the antenna and the display panel.

The window may have an opening that exposes the antenna pad.

The opening may be completely surrounded by the window.

The opening may be connected to an edge of the window and may be partially surrounded by the window.

The electronic device may include the following elements: a bezel pattern disposed closer to the second surface of the antenna base film than to the first surface of the antenna base film; and a protective layer overlapping the antenna base film and covering at least one face of the bezel pattern.

The opening may be overlapped by the bezel pattern.

The window may include a first portion including an edge of the window and may include a second portion spaced from the first portion by the opening. The second portion may be at least as thick as the first portion in a direction perpendicular to the first surface.

The first portion of the window may overlap the circuit film.

The electronic device may include an adhesive layer disposed between the window and the display panel. The adhesive layer may overlap the antenna pad. A portion of the circuit film may be disposed between the antenna pad and the adhesive layer.

The electronic device may include an adhesive layer disposed between the window and the display panel. The adhesive layer may not overlap the antenna pad in a direction perpendicular to the first surface. An edge (or lateral face) of the adhesive layer may face the circuit film.

The circuit film may include a bent portion disposed between the antenna and the display panel and facing the edge (or lateral face) of the adhesive layer.

An embodiment may be related to an electronic device. The electronic device may include a display panel, an antenna, and a circuit film. The antenna may overlap the display panel. The antenna may include a first surface and a second surface positioned farther from the display panel than the first surface. The circuit film may be electrically connected to the antenna.

The electronic device may include the following elements: a first adhesive layer disposed between the first surface of the antenna and the display panel; and a second adhesive layer directly attached to each of the first adhesive layer and the display panel.

At least one of a dielectric constant and a loss value of the first adhesive layer may be lower than at least one of a dielectric constant and a loss value of the second adhesive layer.

An edge of the antenna may be aligned with an edge of the display panel in across-sectional view of the electronic device, or a portion of the antenna protrudes beyond the edge of the display panel in a direction parallel to the first surface of the antenna. The edge of the antenna or the portion of the antenna may overlap the circuit film.

The electronic device may include the following elements: an anti-reflection film overlapping the antenna; and a window overlapping the anti-reflection film. An edge of the anti-reflection film may be aligned with at least one of an edge of the display panel and an edge of the antenna in a cross-sectional view of the electronic device.

The electronic device may include a window disposed between the antenna and the display panel. The window may have an opening that exposes a portion of the circuit film. The circuit film may be electrically connected to the antenna through the opening of the window.

The opening may be completely surrounded by the window or may be connected to an edge of the window and partially surrounded by the window.

The electronic device may include the following elements: a bezel pattern overlapping the second surface of the antenna; and a protective layer overlapping the antenna and covering at least one face of the bezel pattern. The opening may be overlapped by the bezel pattern.

The window may include a first portion including an edge of the window and may include a second portion spaced from the first portion by the opening. The second portion may be at least as thick as the first portion in a direction perpendicular to the first surface. The first portion may overlap the circuit film.

The electronic device may include an adhesive layer disposed between the window and the display panel and overlapping the opening of the window. A portion of the circuit film may be disposed between a portion of the antenna exposed by the opening of the window and the adhesive layer.

The electronic device may include an adhesive layer disposed between the window and the display panel. The circuit film may include a bent portion disposed between the antenna and the display panel. The bent portion may face an edge (or lateral face) of the adhesive layer.

BRIEF DESCRIPTION OF THE FIGURES

Each of FIG. 1A

FIG. 4B is a cross-sectional view of an upper assembly of an electronic device according to an embodiment.

DETAILED DESCRIPTION

Figure 1A:
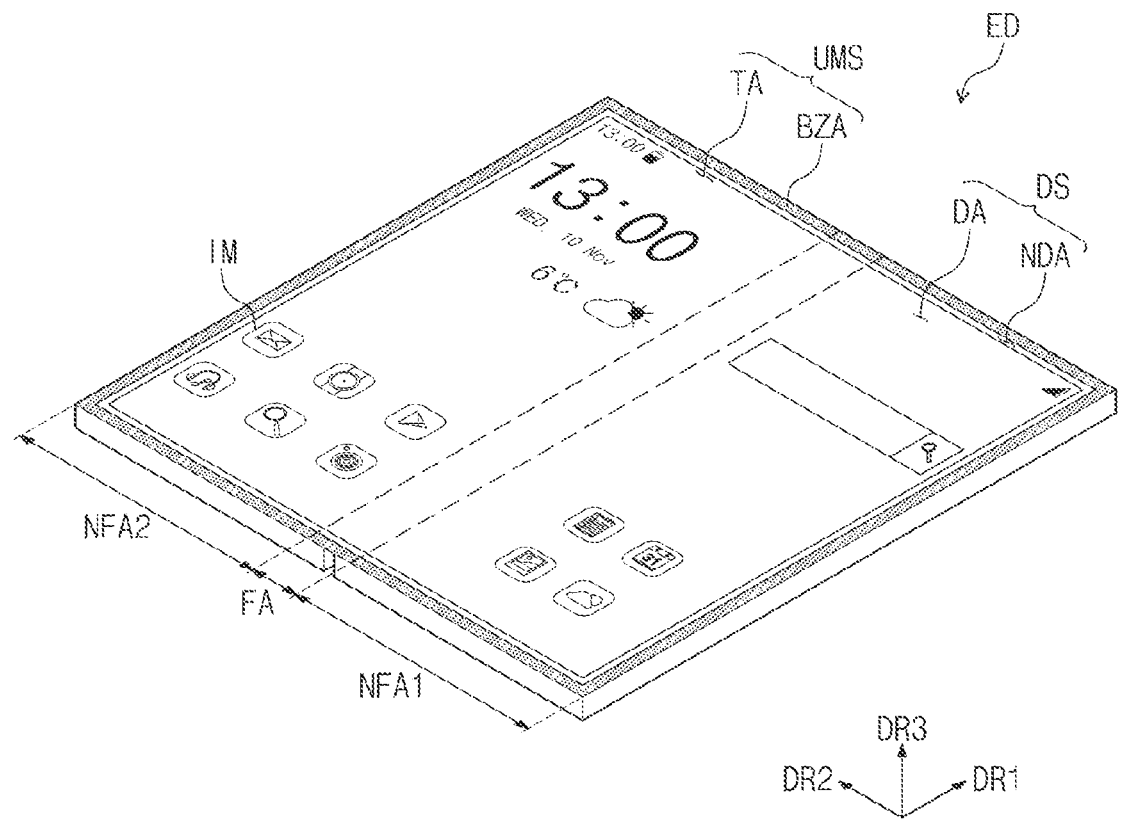
FIG. 1B is a perspective view of an electronic device according to an embodiment.

Examples of embodiments are described with reference to the accompanying drawings.

Identical reference numerals may refer to identical components or analogous components. In the drawings, dimensions of components may be exaggerated for effective description and/or clarity.

Terms such as first, second, and the like may be used to describe various elements/features, but the elements/features should not be limited by the terms. The terms may be used for distinguishing one element/feature from one or more other elements/features. For example, without departing from the scope of practical embodiments, a first element may be referred to as a second element. The description of an element as a first element may not require or imply the presence of a second element or other elements. The terms first, second, etc. may be used to differentiate different categories or sets of elements. For conciseness, the terms first, second, etc. may represent first-category (or first-set), second-category (or second-set), etc., respectively. The terms of a singular form may indicate plural forms unless otherwise specified.

In addition, terms such as below, under, above, and over are used to describe spatial relations of components illustrated in the drawings. The spatial relations may change according to an orientation of a device.

Terms such as comprise, include, and have may specify the presence of the stated elements/features, but may not preclude the presence or addition of one or more other elements/features.

The term "on" may mean "directly on" or "indirectly on." The term "connect" may mean "directly connect" or "indirectly connect." The term "connect" may mean "mechanically connect" and/or "electrically connect." The term "connected" may mean "electrically connected" or "electrically connected through no intervening transistor." The term "insulate" may mean "electrically insulate" or "electrically isolate." The term "conductive" may mean "electrically conductive." The term "drive" may mean "operate" or "control." The term "include" may mean "be made of." The term "adjacent" may mean "immediately adjacent." The expression that an element extends in a particular direction may mean that the element extends lengthwise in the particular direction and/or that the lengthwise direction of the element is in the particular direction. The term "pattern" may mean "member." The term "defined" may mean "formed" or "provided." The expression that a space or opening overlaps an object may mean that (the position of) the space or opening overlaps with (the position of) the object. The term "overlap" may be equivalent to "be overlapped by." The expression that a first element overlaps with a second element in a plan view may mean that the first element overlaps the second element in direction perpendicular to a substrate. The term "edge" may mean "side," "face," or "lateral face."

Figure 1B:
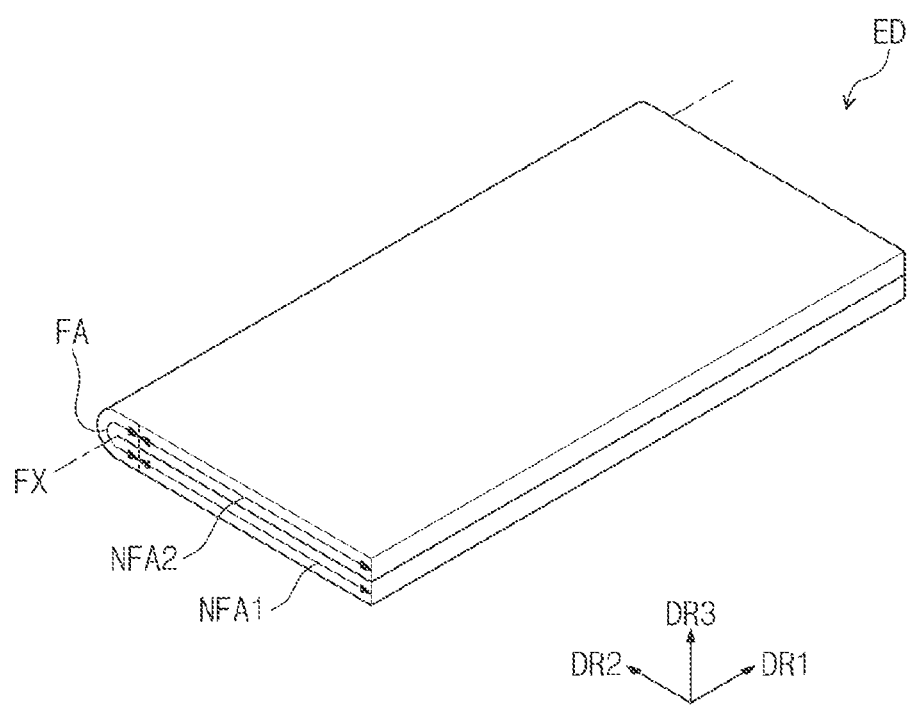

Each of FIG. 1A and FIG. 1B is a perspective view of an electronic device ED according to an embodiment.

FIG. 1A illustrates an unfolded state of the electronic device ED, and FIG. 1B illustrates a folded state of the electronic device ED.

Referring to FIGS. 1A and 1B, the electronic device ED may include a first display surface DS and a second display surface UMS each extending in a first direction DR1 and a second direction DR2 different from the first direction DR1. The electronic device ED may display an image IM on the first display surface DS through the second display surface UMS. The second display surface UMS may be the outermost display surface.

The first display surface DS may include a display area DA and a non-display area NDA around the display area DA. The display area DA may display the image IM, and the non-display area NDA may not display the image IM. The non-display area NDA may surround the display area DA. The shape of the display area DA and the shape of the non-display area NDA may be configured according to particular embodiments.

The second display surface UMS may include a transmissive area TA and a bezel area BZA around the transmissive area TA. The transmissive area TA may be larger area the display area DA. A portion of the non-display area NDA may be exposed by the transmissive area TA. The bezel area BZA may overlap the non-display area NDA. The transmissive area TA may transmit the image IM provided from the display area DA in at least a third direction DR3 (i.e., the thickness direction of the electronic device ED). The third direction DR3 may be perpendicular to each of the directions DR1 and DR2. The bezel area BZA may surround the transmissive area TA. The shape of the transmissive area TA and the shape of the bezel area BZA may be configured according to particular embodiments.

The electronic device ED may include a folding area FA or folding part FA) and a plurality of non-folding areas NFA1 and NFA2 (or non-folding parts NFA1 and NFA2). The non-folding areas NFA1 and NFA2 may include the first non-folding area NFA1 and the second non-folding area NFA2 (mechanically) connected to each other through the folding area FA. The first non-folding area NFA1, the folding area FA, and the second non-folding area NFA2 may be sequentially arranged in the second direction DR2 when the electronic device ED is in the unfolded state.

As illustrated in FIG. 1B, the folding area FA may be folded about a folding axis FX extending in the first direction DR1. The folding area FA may extend in the first direction DR1. The folding area FA may have a certain curvature and a certain radius of curvature when the electronic device ED is in a folded state. The electronic device ED may be folded in an in-folding manner such that the first non-folding area NFA1 and the second non-folding area NFA2 face each other and the first display surface DS and such that the second display surface UMS is concealed.

The electronic device ED may be folded in an out-folding manner such that the first display surface DS and the second display surface UMS are exposed to the outside. The electronic device ED may be configured such that both an in-folding motion and an out-folding motion are able to be performed in a flat state.

FIGS. 1A and 1B illustrate that the electronic device ED has only one folding area FA. The electronic device ED may be a multi-foldable electronic device ED that includes a plurality of folding areas FA. The folding areas FA may be spaced apart from each other. The electronic device ED may be/include a rigid electronic device (without a folding area FA), a rollable electronic device, or a slidable electronic device. Embodiments may be applied to various types of electronic devices ED.

Figure 2A:
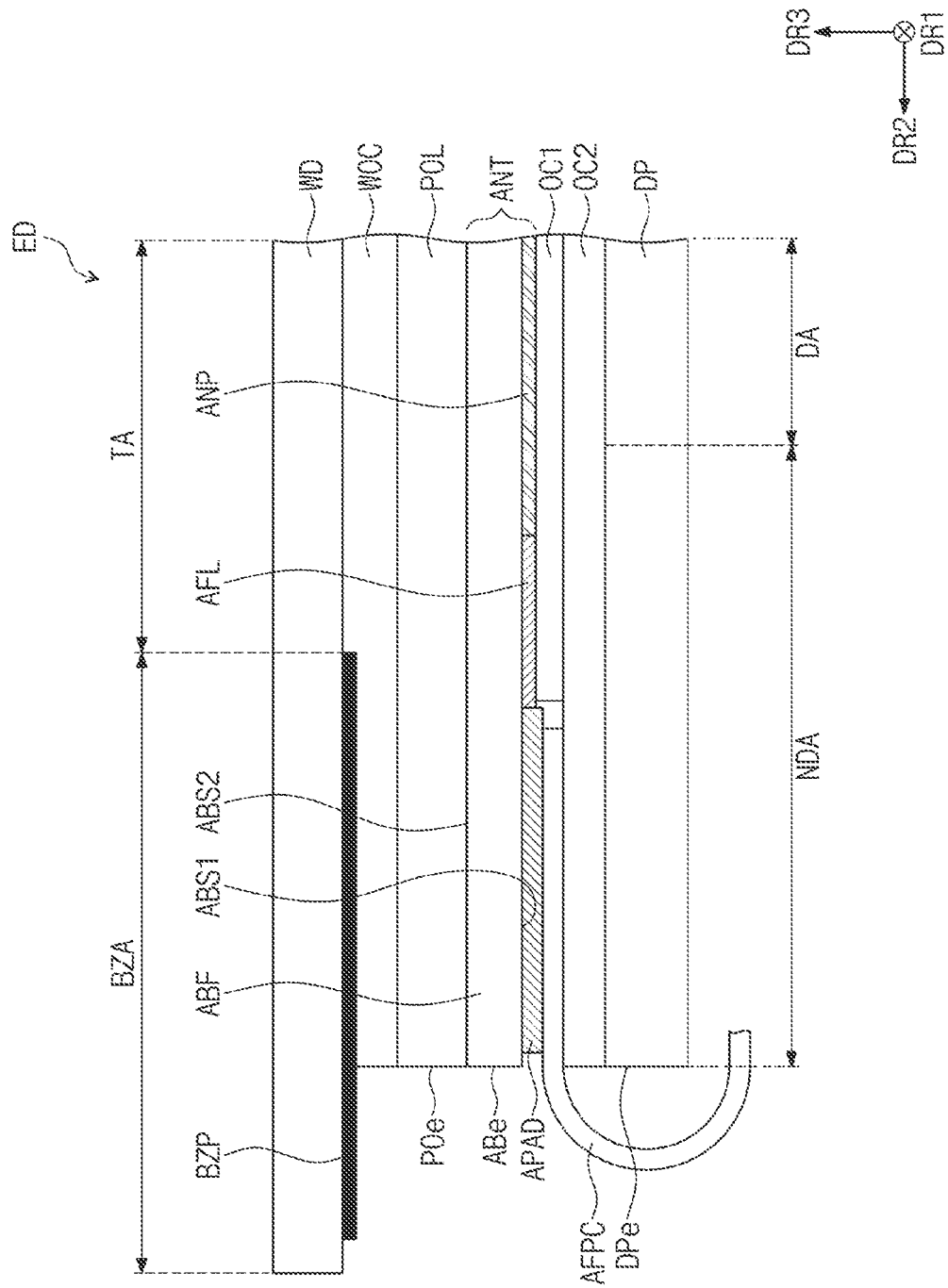
FIG. 2A is a cross-sectional view of an electronic device according to an embodiment.

FIG. 2A is a cross-sectional view of an electronic device ED according to an embodiment.

Referring to FIG. 2A, the electronic device ED may include a window WD, an anti-reflection film POL, an antenna ANT, a circuit film AFPC, and a display panel DP. The window WD, the anti-reflection film POL, the antenna ANT, and the display panel DP may be sequentially stacked, and an adhesive layer may be disposed between the components.

The window WD may contain an optically transparent insulating material. For example, the window WD may contain glass or plastic. The window WD may have a multi-layer structure or a single-layer structure. For example, the window WD may include a plurality of plastic films bonded by an adhesive, and/or may include a glass substrate and a plastic film bonded by an adhesive.

A bezel pattern BZP (or bezel member BZP) may be disposed on one surface of the window WD. For example, the bezel pattern BZP may be disposed on the lower surface of the window WD. The bezel area BZA may be defined by the bezel pattern BZP. The second display surface UMS (refer to FIG. 1A) may be defined on the window WD. The bezel area BZA may overlap with the bezel pattern BZP, and the transmissive area TA may not overlap with the bezel pattern BZP.

The anti-reflection film POL may be disposed under the window WD. The anti-reflection film POL may lower the reflectivity of light incident from the outside. The anti-reflection film POL may include a phase retarder and/or a polarizer. The anti-reflection film POL may include at least a polarizer film. The anti-reflection film POL may be attached to the window WD through an adhesive layer WOC.

The antenna ANT may be disposed under the anti-reflection film POL. The antenna ANT may transmit and/or receive wireless communication signals, for example, radio frequency signals. The antenna ANT may be referred to as the antenna layer, the antenna film, or the radio frequency device layer. The antenna ANT may include an antenna base film ABF, an antenna pattern ANP (or antenna member ANP), an antenna feed line AFL, and an antenna pad APAD.

The antenna base film ABF may include a first surface ABS1 and a second surface ABS2 opposite the first surface ABS1. The first surface ABS1 may be closer to the display panel DP than the second surface ABS2. The first surface ABS1 may be disposed between the display panel DP and the second surface ABS2. The first surface ABS1 may be referred to as the lower surface, and the second surface ABS2 may be referred to as the upper surface.

The antenna pattern ANP, the antenna feed line AFL, and the antenna pad APAD may be disposed on the first surface ABS1 of the antenna base film ABF. The antenna pattern ANP, the antenna feed line AFL, and the antenna pad APAD may be connected together to form an integrated structure. The antenna pad APAD may overlap the bezel area BZA in the third direction DR3.

The display panel DP may be disposed under the antenna ANT. The display panel DP may generate an image and may sense an external input applied by an external entity. The display panel DP may include a display layer and a sensor layer disposed on the display layer. The display layer may display an image. The display layer may be an emissive display layer. The display layer may be an organic light emitting display layer, an inorganic light emitting display layer, an organic-inorganic light emitting display layer, a quantum dot display layer, a micro-LED display layer, or a nano-LED display layer. The sensor layer may be formed during the manufacturing process of the display layer. The sensor layer may be formed in a separated manufacturing process and may be coupled to the display layer through an adhesive member.

The first display surface DS (refer to FIG. 1A) may be defined on the display panel DP. The display panel DP may include a plurality of pixels. The area in which the plurality of pixels are disposed to provide an image may be defined as the display area DA, and the area that includes no pixels and does not display an image in response to input signals may be defined as the non-display area NDA.

The circuit film AFPC may be electrically connected to the antenna ANT. The circuit film AFPC may be attached to the antenna pad APAD through a conductive adhesive film. The antenna ANT may receive signals through the circuit film AFPC, and/or may transfer signals through the circuit film AFPC. The circuit film AFPC may be a flexible printed circuit film. The circuit film AFPC may be bent toward the rear surface of the display panel DP. The circuit film AFPC may be electrically connected to another circuit board.

The circuit film AFPC may be attached to the first surface ABS1 of the antenna base film ABF through the antenna pad APAD. The circuit film AFPC may be attached to the lower surface ABS1 of the antenna ANT through the antenna pad APAD. An entire face of the anti-reflection film POL may be attached to the second surface ABS2 of the antenna base film ABF. The circuit film AFPC may not be located between the anti-reflection film POL and the antenna ANT. Advantageously, unwanted conspicuous bubbles and undesirable reduction of reliability due to a step between the anti-reflection film POL and the antenna ANT may be prevented.

Because the antenna pad APAD to be attached to the circuit film AFPC is disposed on the first surface ABS1, the anti-reflection film POL does not have avoid overlapping the antenna pad APAD. The anti-reflection film POL may overlap the antenna pad APAD. Therefore, an edge POe of the anti-reflection film POL may be sufficiently spaced from the border between the bezel area BZA and the transmissive area TA. Advantageously, the edge POe of the anti-reflection film POL may be invisible to users of the electronic device ED.

The edge POe of the anti-reflection film POL and the circuit film AFPC may be located on different layers. The edge Poe of the anti-reflection film POL and the circuit film AFPC may be spaced from each other by the antenna ANT and may not direct contact each other. In a plan view of the electronic device, the antenna pad APAD may be disposed between the edge POe of the anti-reflection film POL and the border between the bezel area BZA and the transmissive area TA. The antenna pad APAD does not have to avoid overlapping the anti-reflection film POL. Advantageously, the bezel area BZA may be minimized.

A first adhesive layer OC1 may be disposed between the display panel DP and the antenna ANT, and a second adhesive layer OC2 may be disposed between the first adhesive layer OC1 and the display panel DP. The first adhesive layer OC1 and the second adhesive layer OC2 may be attached to each other.

The first adhesive layer OC1 is located closer to the antenna ANT than the second adhesive layer OC2. To improve antenna characteristics, a low dielectric constant or a low loss value may be required for the first adhesive layer OC1.

The first adhesive layer OC1 and the second adhesive layer OC2 may have different mechanical properties and/or electrical properties. The mechanical properties may include optical characteristics (e.g., transmittance), an adhesive force, and the like. The electrical properties may include a dielectric constant, a loss value (e.g., dielectric loss), and the like.

If only one adhesive layer is used, when adjusting electrical properties of the adhesive layer to improve antenna characteristics, mechanical properties of the adhesive layer may be changed. For example, when the adhesive layer has a low dielectric constant, the transmittance or the adhesive force of the adhesive layer may be lowered.

The adhesive layer disposed between the antenna ANT and the display panel DP may include two different adhesive layers: the first adhesive layer OC1 and the second adhesive layer OC2. The first adhesive layer OC1 may be designed to improve antenna characteristics, and the second adhesive layer OC2 may be designed to satisfy mechanical characteristics. Accordingly, physical properties of the first adhesive layer OC1 and the second adhesive layer OC2 may be more easily optimized. To improve antenna characteristics, the first adhesive layer OC1 may have a lower dielectric constant than that of the second adhesive layer OC2. The first adhesive layer OC1 may have a lower loss value than that of the second adhesive layer OC2.

The first adhesive layer OC1 may have a different shape from the second adhesive layer OC2. The first adhesive layer OC1 may cover the antenna pattern ANP and the antenna feed line AFL and may not overlap the antenna pad APAD. The second adhesive layer OC2 may overlap each of the antenna pattern ANP, the antenna feed line AFL, and the antenna pad APAD. A portion of the circuit film AFPC may be disposed between a portion of the second adhesive layer OC2 and the antenna pad APAD. The second adhesive layer OC2 may be wider and/or longer than the first adhesive layer OC1. In a plan view of the electronic device ED, the area of the second adhesive layer OC2 may be larger than the area of the first adhesive layer OC1.

An edge ABe of the antenna base film ABF, the edge POe of the anti-reflection film POL, and an edge DPe of the display panel DP may be aligned and/or coplanar with one another. In a plan view of the electronic device ED, the edge ABe of the antenna base film ABF, the edge POe of the anti-reflection film POL, and the edge DPe of the display panel DP may be disposed in the bezel area BZA.

Figure 2B:
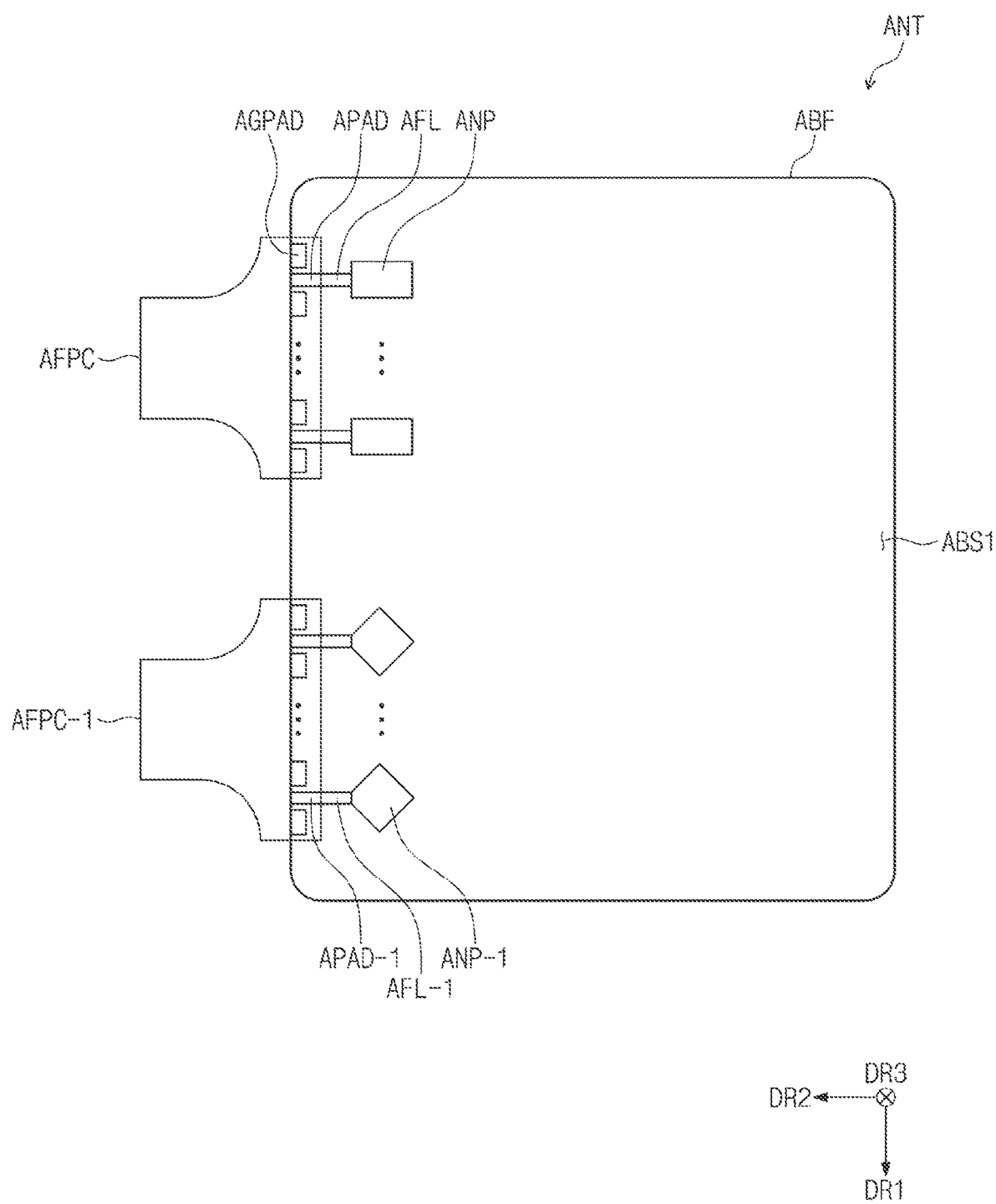
FIG. 2B is a plan view of an antenna and a circuit film of an electronic device according to an embodiment.

FIG. 2B is a plan view illustrating the antenna ANT and the circuit film AFPC of an electronic device according to an embodiment.

Referring to FIG. 2B, the lower surface ABS1 of the antenna ANT is illustrated. A plurality of antenna patterns ANP (or antenna members ANP), a plurality of antenna feed lines AFL, and a plurality of antenna pads APAD may be provided on the lower surface ABS1 of the antenna ANT. Two antenna ground pads AGPAD may be spaced from each other with one antenna pad APAD being disposed between the two antenna ground pads AGPAD.

The antenna ANT may further include additional antenna patterns ANP-1 (or additional antenna members ANP-1), additional antenna feed lines AFL-1, and additional antenna pads APAD-1, and an additional circuit film AFPC-1 may be connected to the additional antenna pads APAD-1. The additional circuit film AFPC-1 may also be attached to the first surface ABS1 of the antenna base film ABF.

The antenna patterns ANP and the additional antenna patterns ANP-1 may have different shapes and may transmit and/or receive signals in different frequency bands. The antenna patterns ANP and the additional antenna patterns ANP-1 may have the same shape and may transmit and/or receive signals in the same frequency band.

The antenna ANT may not include the additional antenna patterns ANP-1, the additional antenna feed lines AFL-1, and the additional antenna pads APAD-1. The antenna ANT may further include other antenna patterns, in addition to the antenna patterns illustrated in FIG. 2B.

The antenna patterns ANP, the antenna feed lines AFL, the additional antenna patterns ANP-1, and the additional antenna feed lines AFL-1 may each have a mesh structure including a plurality of openings. The antenna patterns ANP, the antenna feed lines AFL, the additional antenna patterns ANP-1, and the additional antenna feed lines AFL-1 may each contain an optically transparent conductive material. Accordingly, even when the antenna patterns ANP, the antenna feed lines AFL, the additional antenna patterns ANP-1, and the additional antenna feed lines AFL-1 overlap the display area DA (refer to FIG. 1A), an image provided by the display panel DP (refer to FIG. 2A) may be clearly displayed.

Figure 3:
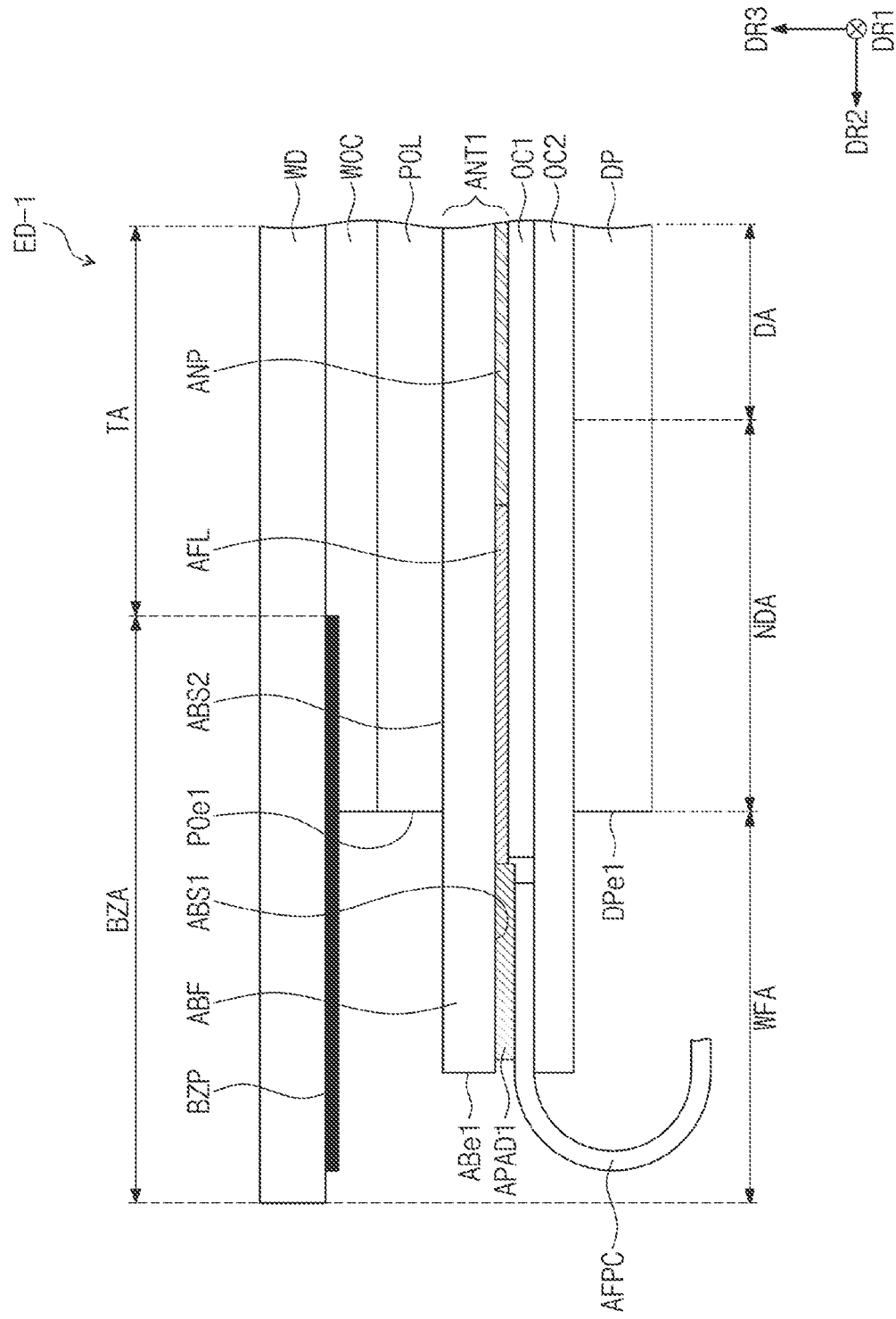
FIG. 3 is a cross-sectional view of an electronic device according to an embodiment.

FIG. 3 is a cross-sectional view of an electronic device ED-1 according to an embodiment.

Referring to FIG. 3, an antenna ANT1 may be disposed between an anti-reflection film POL and a display panel DP. An edge ABe1 of an antenna base film ABF may not be aligned (or coplanar) with an edge POe1 of the anti-reflection film POL. The edge ABe1 of the antenna base film ABF may further protrude beyond the edge POe1 of the anti-reflection film POL in the second direction DR2. An antenna pad APAD1 may not overlap the anti-reflection film POL in the third direction DR3. The edge POe1 of the anti-reflection film POL and an edge DPe1 of the display panel DP may be aligned and/or coplanar with each other.

The antenna pad APAD1 may be disposed in a waterproof area WFA. The waterproof area WFA may be filled with a waterproof tape or a resin when the components illustrated in FIG. 3 are attached to a set bracket. The waterproof tape or the resin may be disposed on the rear surface of a window WD. To reduce the protrusion of the region where the antenna ANT1 beyond the display panel DP and the anti-reflection film POL in the waterproof area WFA, the antenna pad APAD1 may be shorter than the antenna pad APAD illustrated in FIG. 2A in the second direction DR2. Accordingly, deterioration in waterproof performance may be prevented.

Figure 4A:
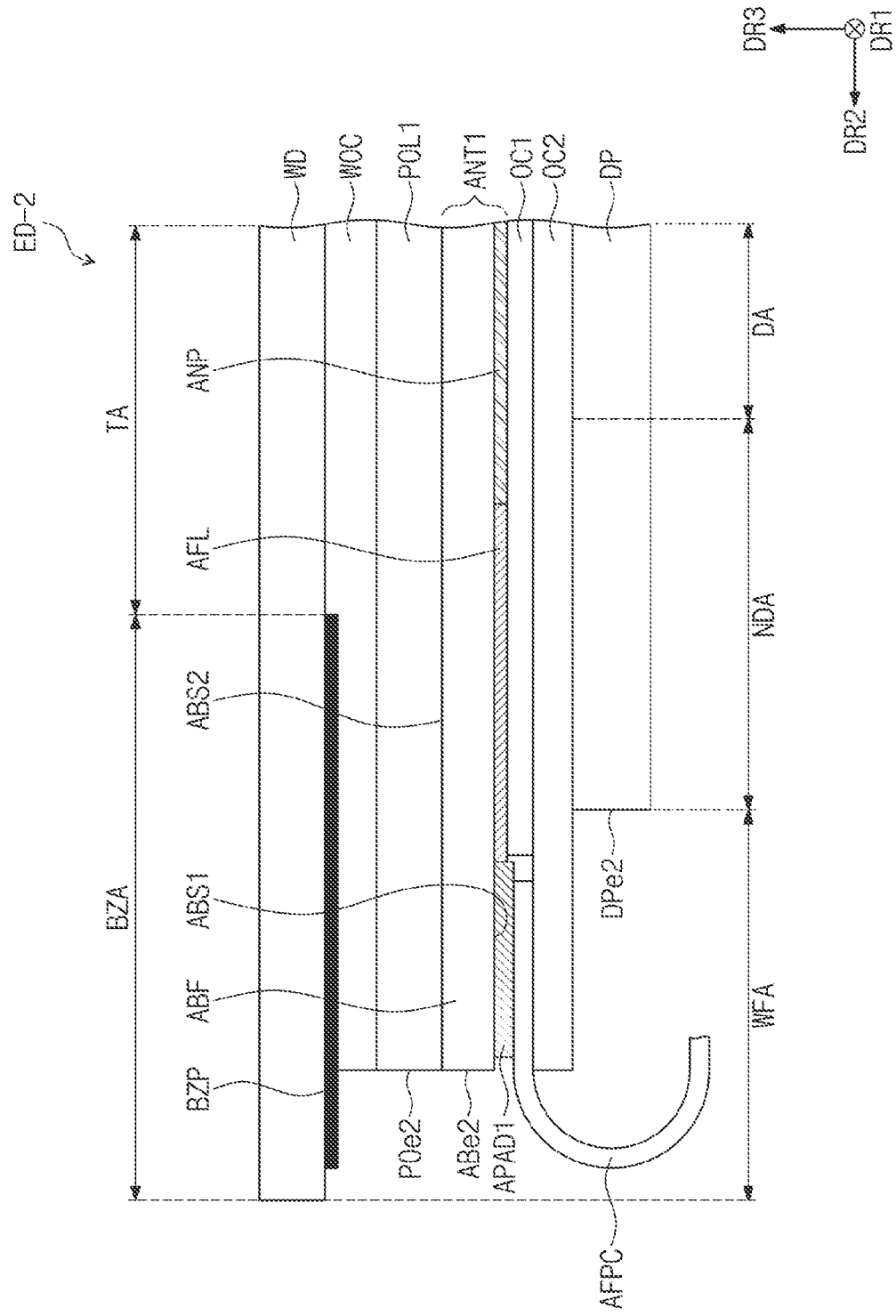
FIG. 4A is a cross-sectional view of an electronic device according to an embodiment.

FIG. 4A is a cross-sectional view of an electronic device ED-2 according to an embodiment. FIG. 4B is a cross-sectional view of an upper assembly UPA of the electronic device ED-2 according to an embodiment.

Referring to FIGS. 4A and 4B, an antenna ANT1 may be disposed between an anti-reflection film POL1 and a display panel DP. An edge ABe2 of an antenna base film ABF and an edge POe2 of the anti-reflection film POL1 may be aligned and/or coplanar with each other. The edge ABe2 of the antenna base film ABF and the edge POe2 of the anti-reflection film POL1 may further protrude beyond an edge DPe2 of the display panel DP in the second direction DR2. Accordingly, an antenna pad APAD1 and a portion of the anti-reflection film POL1 may not overlap the display panel DP in the third direction DR3.

Referring to FIG. 4A, layers disposed between a window WD and the antenna ANT1 may all extend to the edge ABe2 of the antenna ANT1. Not only the antenna ANT1, but also an adhesive layer WOC and the anti-reflection film POL1 may extend to a waterproof area WFA. When the components illustrated in FIG. 4A are attached to a set bracket, a waterproof tape or a resin may be disposed on the rear surface of a second adhesive layer OC2 or a first surface ABS1 of the antenna base film ABF.

The upper assembly UPA may include the window WD, the adhesive layer WOC, the anti-reflection film POL1, and the antenna ANT1. The upper assembly UPA may be attached to the display panel DP through the first adhesive layer OC1 and the second adhesive layer OC2 illustrated in FIG. 4A.

Figure 5A:
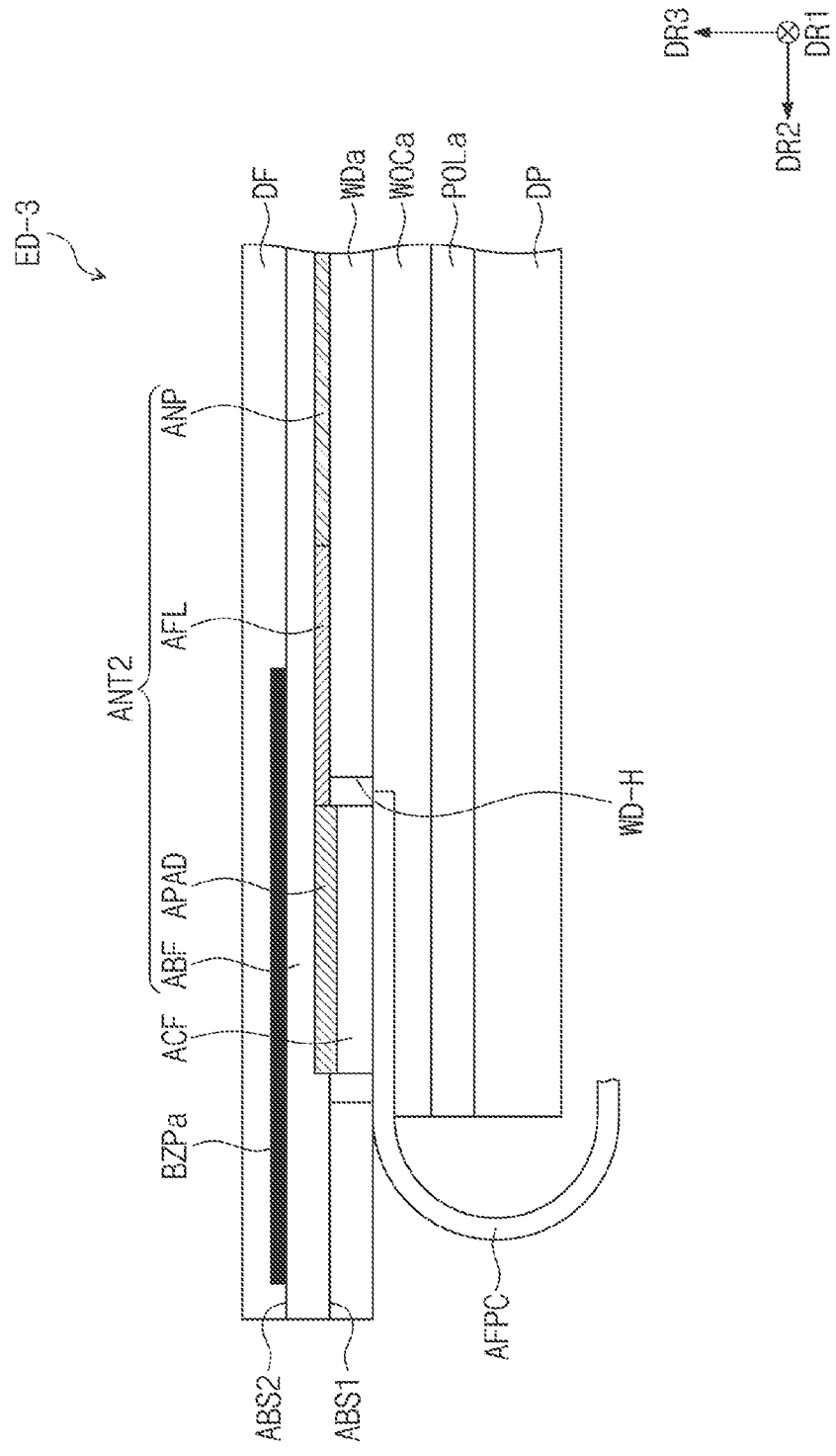
FIG. 5A is a cross-sectional view of an electronic device according to an embodiment.
Figure 5B:
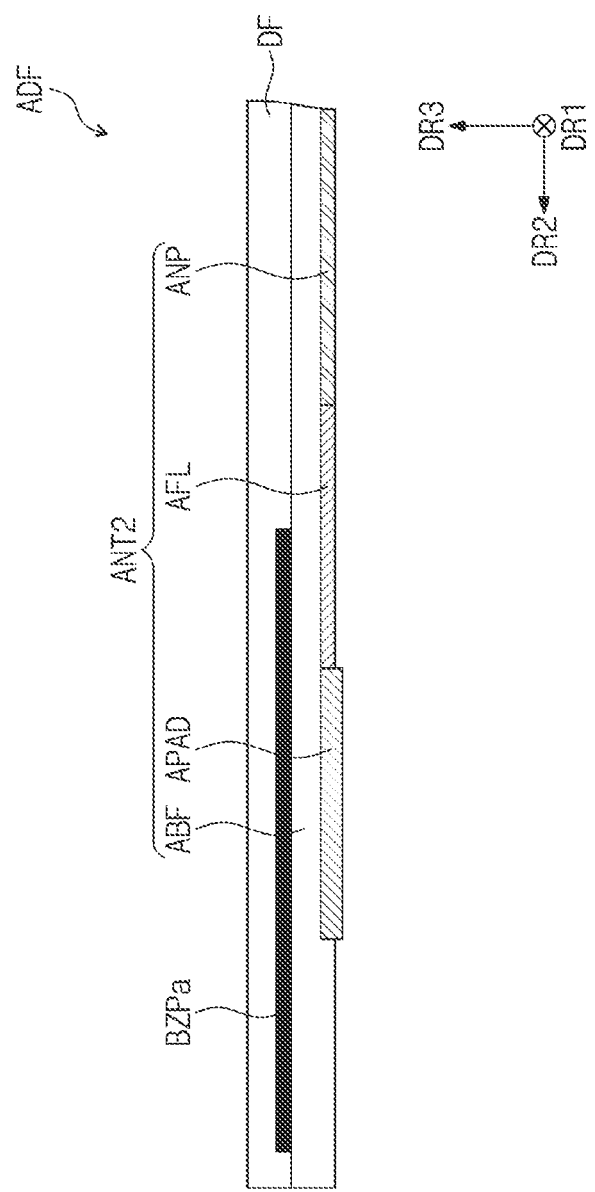
FIG. 5B is a cross-sectional view of an upper assembly of an electronic device according to an embodiment.

FIG. 5A is a cross-sectional view of an electronic device ED-3 according to an embodiment. FIG. 5B is a cross-sectional view of an upper assembly ADF of the electronic device ED-3 according to an embodiment.

Referring to FIG. 5A, the electronic device ED-3 may include a display panel DP, an anti-reflection layer POLa, a window WDa, an antenna ANT2, and a circuit film AFPC. The display panel DP, the anti-reflection layer POLa, the window WDa, and the antenna ANT2 may be sequentially stacked, and an adhesive layer may be disposed between the components.

The antenna ANT2 may include an antenna base film ABF, an antenna pattern ANP, an antenna feed line AFL, and an antenna pad APAD. The antenna base film ABF may include a first surface ABS1 and a second surface ABS2 opposite the first surface ABS1. The first surface ABS1 may be closer to the display panel DP than the second surface ABS2.

A bezel pattern BZPa and a protective layer DF covering the bezel pattern BZPa may be disposed on the second surface ABS2 of the antenna base film ABF. The bezel pattern BZPa and the protective layer DF may be referred to as the decorative layer.

The bezel pattern BZPa and the protective layer DF may be formed on the antenna base film ABF. The antenna ANT2, the bezel pattern BZPa, and the protective layer DF may constitute the upper assembly ADF. The upper assembly ADF may be referred to as the antenna decoration film. The upper assembly ADF may have a composite structure in which the antenna pattern ANP, the antenna feed line AFL, and the antenna pad APAD are disposed on a sheet of film. The bezel pattern BZPa and the protective layer DF are disposed on the second surface ABS2 of the antenna base film ABF. As the upper assembly ADF includes a sheet of antenna base film ABF, the thickness of the upper assembly ADF may be minimized, and the manufacturing cost of the electronic device ED-3 may be reduced.

The window WDa may be disposed between the display panel DP and the antenna ANT2. An opening WD-H overlapping the antenna pad APAD may be defined in the window WDa. The circuit film AFPC may be electrically connected with the antenna ANT2 through the opening WD-H of the window WDa. For example, a conductive adhesive film ACF may be disposed in the opening WD-H of the window WDa. The conductive adhesive film ACF may be attached to each of the circuit film AFPC and the antenna pad APAD.

The opening WD-H of the window WDa may overlap the bezel pattern BZPa in the third direction DR3. The position of the opening WD-H of the window WDa may be freely defined in a bezel area BZA irrespective of a non-display area NDA of the display panel DP.

As the window WDa is disposed between the antenna ANT2 and the display panel DP, the distance between the antenna pattern ANP and a ground may be increased, and thus antenna performance may be improved. The ground may be disposed under the display panel DP. For example, a lower member may be additionally disposed under the display panel DP, and the lower member may be a plate containing copper or a copper alloy. The lower member may perform a ground function for the antenna ANT2. The lower member may be referred to as the ground, the ground member, or the ground layer.

An adhesive layer WOCa may be attached to the lower surface of the window WDa, which faces the display panel DP. The adhesive layer WOCa may overlap the antenna pad APAD in the third direction DR3. A portion of the circuit film AFPC may be disposed between the antenna pad APAD (exposed through the opening WD-H of the window WDa) and the adhesive layer WOCa.

The anti-reflection layer POLa may be disposed between the window WDa and the display panel DP. The anti-reflection film POLa may be attached to the window WDa through the adhesive layer WOCa. The anti-reflection layer POLa may be/include a polarizer film. The anti-reflection layer POLa may include color filers. The anti-reflection layer POLa may be directly formed on the display panel DP. The color filters may have a predetermined arrangement. The arrangement of the color filters may be determined in consideration of light emission colors of pixels included in the display panel DP. The anti-reflection layer POLa may include a black matrix adjacent to the color filters. The anti-reflection layer POLa may include a destructive interference structure. The destructive interference structure may include a first reflective layer and a second reflective layer disposed on different layers. First reflected light and second reflected light reflected from the first reflective layer and the second reflective layer, respectively, may destructively interfere with each other, and thus the reflectivity of external light may be decreased. The anti-reflection layer POLa may be optional.

The window WDa is disposed under the antenna ANT2, and therefore two different adhesive layers, for example, the first and second adhesive layers OC1 and OC2 of FIG. 2A may not be omitted required. Accordingly, the thickness of the electronic device ED-3 may be minimized, and the folding reliability of the electronic device ED-3 may be improved. An improvement in antenna characteristics may be achieved.

Figure 6A:
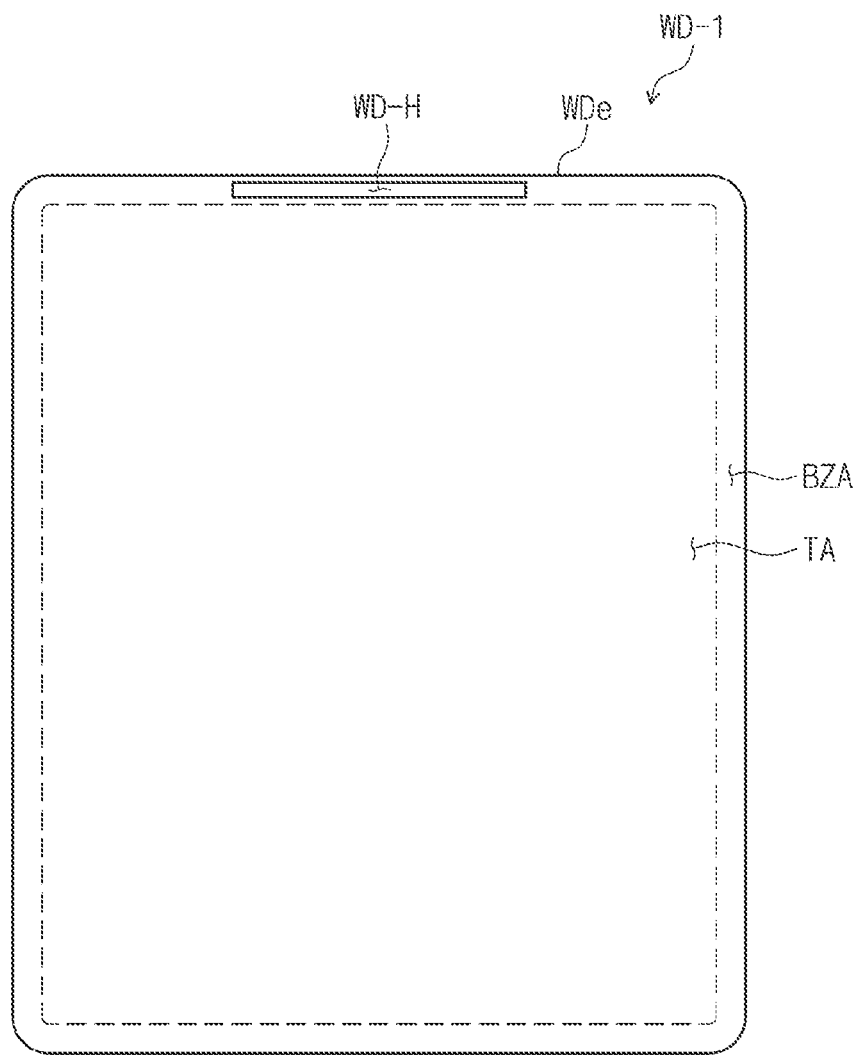
FIG. 6A is a plan view of a window of an electronic device according to an embodiment.

FIG. 6A is a plan view of a window WD-1 according to an embodiment.

The window WD-1 illustrated in FIG. 6A is an example of the window WDa illustrated in FIG. 5A. An opening WD-H is defined in the window WD-1. The opening WD-H may expose the antenna pad APAD. The opening WD-H may be spaced apart from an edge WDe of the window WD-1. The opening WD-H may be completely surrounded by the window WD-1.

Figure 6B:
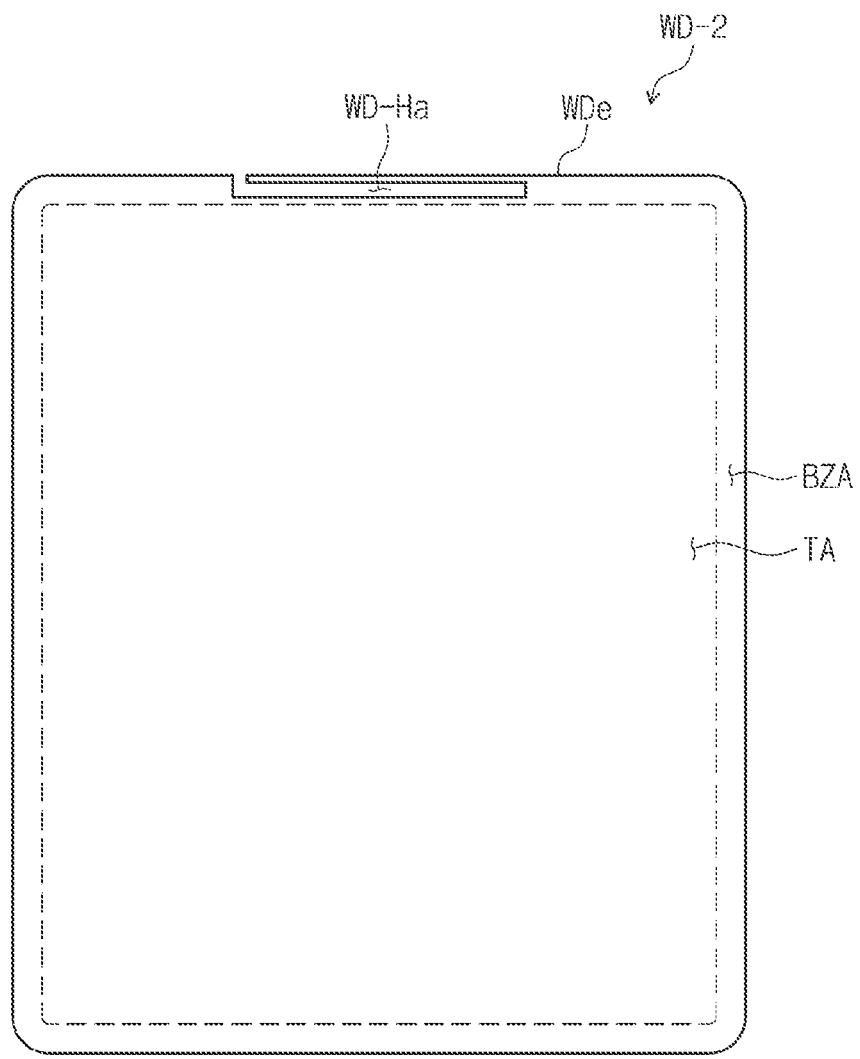
FIG. 6B is a plan view of a window of an electronic device according to an embodiment.

FIG. 6B is a plan view of a window WD-2 according to an embodiment.

The window WD-2 illustrated in FIG. 6B is an example of the window WDa illustrated in FIG. 5A. An opening WD-Ha is defined in the window WD-2. The opening WD-Ha may be connected to an edge WDe of the window WD-2 and is partially surrounded by the window WD-2. The cut-away portion of the edge WDe may be narrower than the opening WD-Ha in the first direction DR1.

Figure 6C:
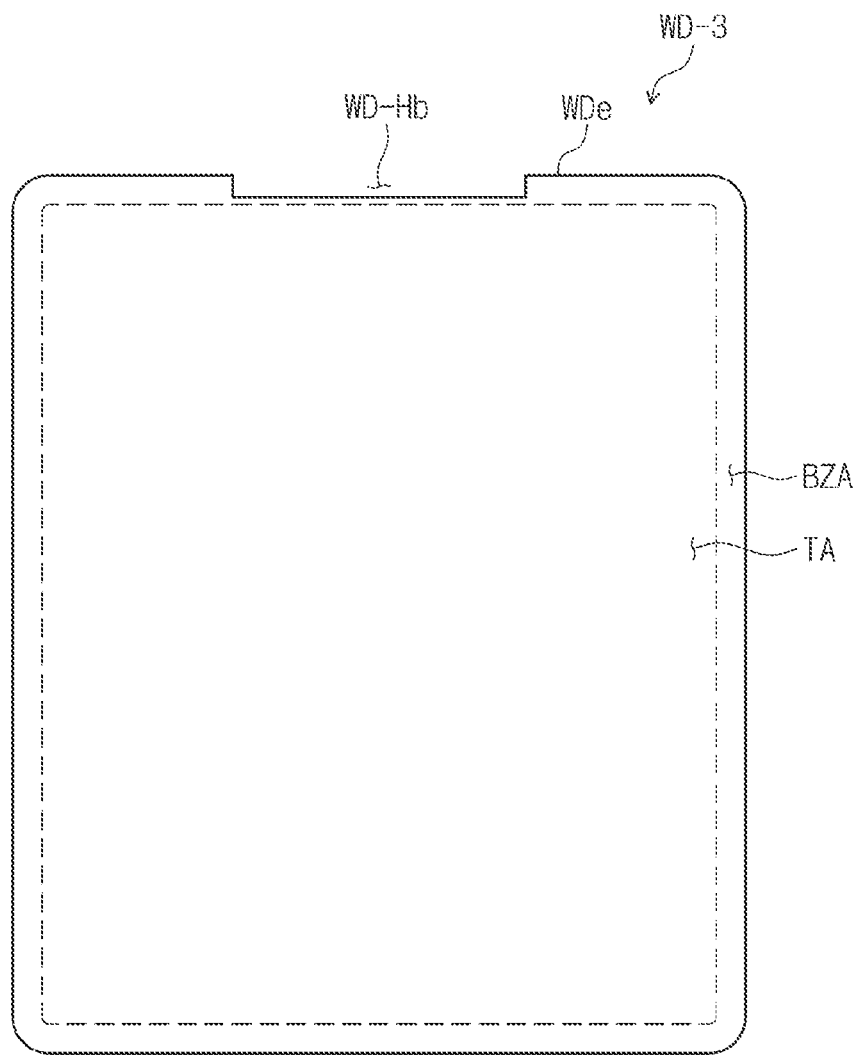
FIG. 6C is a plan view of a window of an electronic device according to an embodiment.

FIG. 6C is a plan view of a window WD-3 according to an embodiment.

The window WD-3 illustrated in FIG. 6C is an example of the window WDa illustrated in FIG. 5A. An opening WD-Hb is defined in the window WD-3. The opening WD-Hb may be connected to an edge WDe of the window WD-3 and is open in the second direction DR2. The width of the cut-away portion of the edge WDe may be substantially the same as the width of the opening WD-Hb in the first direction DR1.

The shapes of the openings WD-H, WD-Ha, and WD-Hb illustrated in FIGS. 6A, 6B, and 6C are illustrative. The shapes of the openings WD-H, WD-Ha, and WD-Hb may be configured according to particular embodiments for exposing the antenna pad APAD (refer to FIG. 5A).

Figure 7:
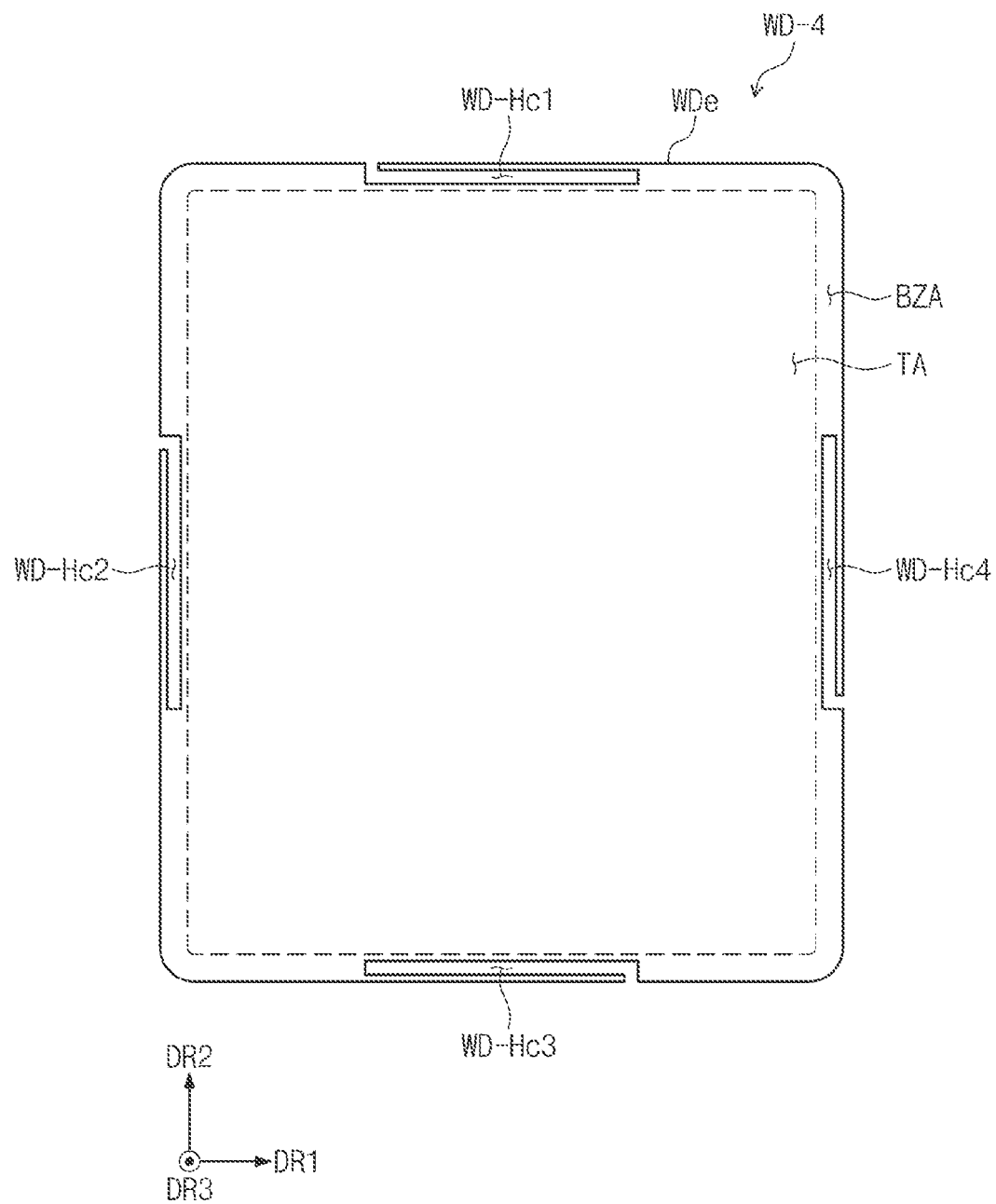
FIG. 7 is a plan view of a window of an electronic device according to an embodiment.

FIG. 7 is a plan view of a window WD-4 according to an embodiment.

The window WD-4 illustrated in FIG. 7 is an example of the window WDa illustrated in FIG. 5A. A plurality of openings WD-Hc1, WD-Hc2, WD-Hc3, and WD-Hc4 may be defined in the window WD-4. The openings WD-Hc1, WD-Hc2, WD-Hc3, and WD-Hc4 may be defined in a bezel area BZA.

Antenna pads electrically connected to antenna patterns may be exposed by the openings WD-Hc1, WD-Hc2, WD-Hc3, and WD-Hc4, respectively. Although FIG. 2B illustrates that the antenna patterns ANP and ANP1 are disposed adjacent to one side of the antenna base film ABF, antenna patterns may be disposed adjacent to four sides of the antenna base film ABF and may be exposed by the openings WD-Hc1, WD-Hc2, WD-Hc3, and WD-Hc4.

Figure 8A:
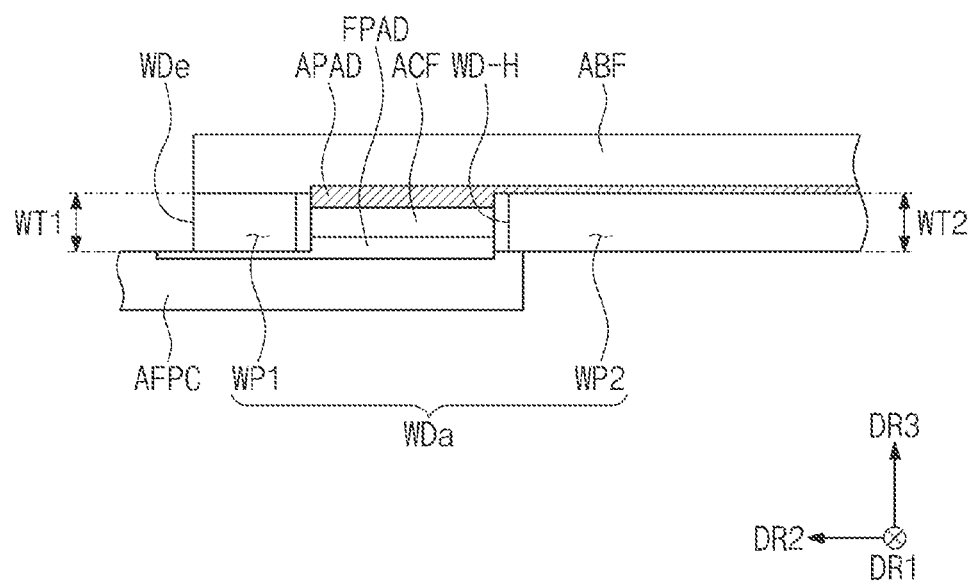
FIG. 8A is a cross-sectional view illustrating a portion of the electronic device illustrated in FIG. 5A according to an embodiment.

FIG. 8A is a cross-sectional view illustrating a portion of the electronic device ED-3 (refer to FIG. 5A) according to an embodiment.

Referring to FIG. 8A, the window WDa may include a first portion WP1 adjacent to an edge WDe of the window WDa and a second portion WP2 spaced apart from the first portion WP1 by the opening WD-H. The first portion WP1 of the window WDa may be substantially/completely overlapped by the circuit film AFPC. The thickness WT1 of the first portion WP1 and the thickness WT2 of the second portion WP2 may be substantially the same as each other. The antenna pad APAD may be electrically connected with a pad FPAD of the circuit film AFPC through the conductive adhesive film ACF.

Figure 8B:
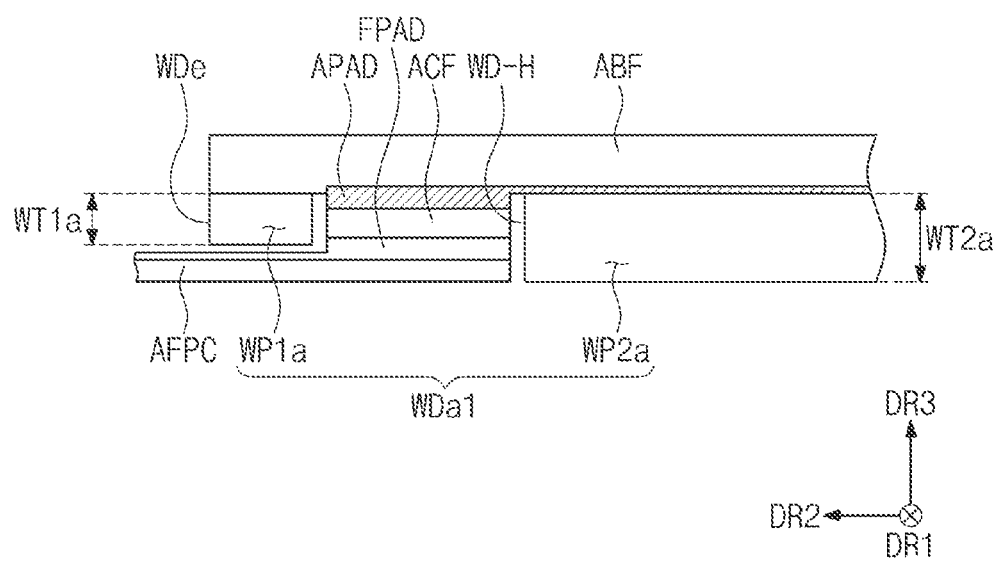
FIG. 8B is a cross-sectional view illustrating a portion of the electronic device illustrated in FIG. 5A according to an embodiment.

FIG. 8B is a cross-sectional view illustrating a portion of the electronic device according to an embodiment.

Referring to FIG. 8B, the window WDa1 may include a first portion WP1$a$ adjacent to an edge WDe of the window WDa1 and a second portion WP2$a$ spaced apart from the first portion WP1$a$ by the opening WD-H. The first portion WP1$a$ of the window WDa1 may be substantially/completely overlapped by the circuit film AFPC. The thickness WT1$a$ of the first portion WP1$a$ may be smaller than the thickness WT2$a$ of the second portion WP2$a$ in the third direction DR3. A step caused by the circuit film AFPC may be compensated for by making the thickness WT1$a$ of the first portion WP1$a$ smaller than the thickness WT2$a$ of the second portion WP2$a$.

Figure 9:
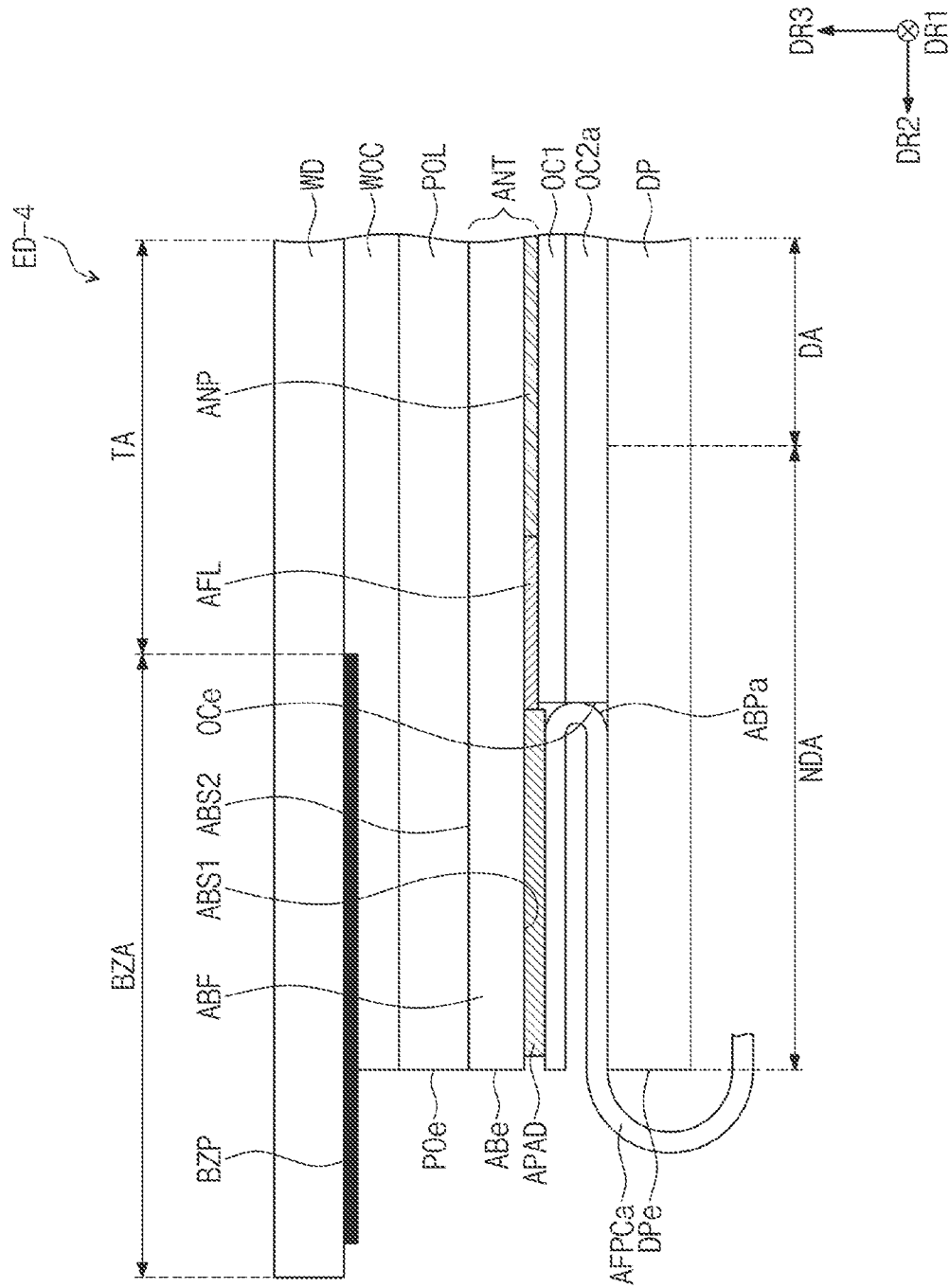
FIG. 9 is a cross-sectional view of an electronic device according to an embodiment.

FIG. 9 is a cross-sectional view of an electronic device ED-4 according to an embodiment.

Referring to FIG. 9, a first adhesive layer OC1 may be disposed between a display panel DP and an antenna ANT, and a second adhesive layer OC2$a$ may be disposed between the first adhesive layer OC1 and the display panel DP. The first adhesive layer OC1 and the second adhesive layer OC2$a$ may be attached to each other. The first adhesive layer OC1 and the second adhesive layer OC2$a$ may substantially cover a face of an antenna pattern ANP and a face of an antenna feed line AFL and may not overlap an antenna pad APAD in the third direction DR3.

Edges OCe of the first adhesive layer OC1 and the second adhesive layer OC2$a$ may face a circuit film AFPCa. The circuit film AFPCa may include a bent portion ABPa disposed between the antenna ANT and the display panel DP. The bent portion ABPa of the circuit film AFPCa may have a predetermined curvature. The bent portion ABPa may face the edges OCe of the first adhesive layer OC1 and the second adhesive layer OC2a.

The circuit film AFPCa may be electrically connected to the antenna ANT not only in the direction illustrated in FIG. 2A but also in the direction illustrated in FIG. 9. The coupling direction of the circuit film AFPCa coupled to the antenna ANT may be configured according to particular embodiments.

Figure 10:
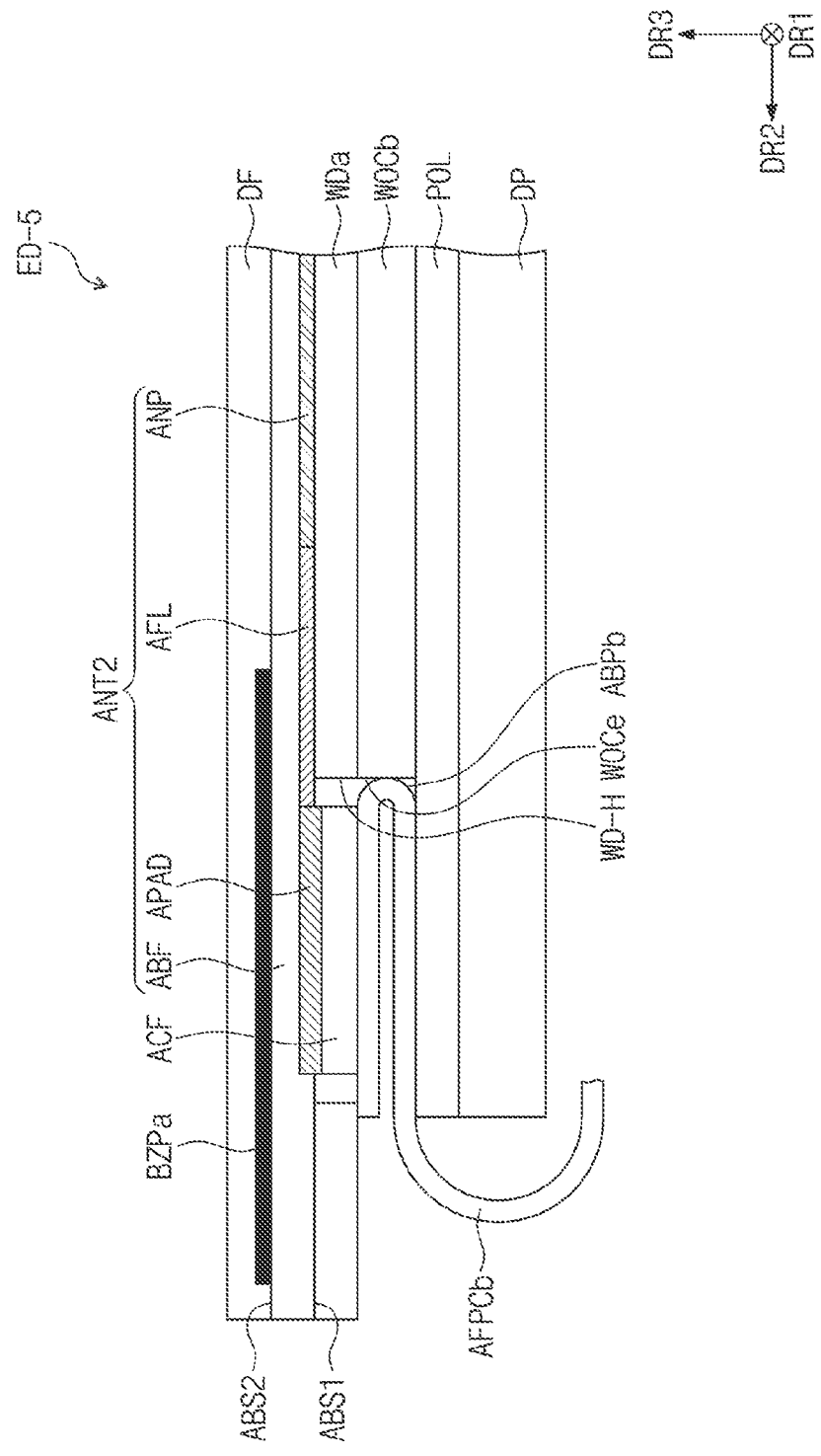
FIG. 10 is a cross-sectional view of an electronic device according to an embodiment.

FIG. 10 is a sectional view of an electronic device ED-5 according to an embodiment.

Referring to FIG. 10, an adhesive layer WOCb is disposed between a window WDa and a display panel DP and is disposed between the window WDa and an anti-reflection film POL. The adhesive layer WOCb may not overlap an antenna pad APAD in the third direction DR3. An edge WOCe of the adhesive layer WOCb may face a circuit film AFPCb.

The circuit film AFPCb may include a bent portion ABPb disposed between an antenna ANT2 and the display panel DP. The bent portion ABPb of the circuit film AFPCb may have a predetermined curvature. The bent portion ABPb may face the edge WOCe of the adhesive layer WOCb.

The circuit film AFPCb may be electrically connected to the antenna ANT2 not only in the direction illustrated in FIG. 5A but also in the direction illustrated in FIG. 10. The coupling direction of the circuit film AFPCb coupled to the antenna ANT2 may be configured according to particular embodiments.

According to embodiments, the circuit film may be attached to the first surface of the antenna that is adjacent to the display panel. The circuit film may not directly contact the anti-reflection film disposed on the second surface of the antenna. Advantageously, unwanted conspicuous bubbles and undesirable reduction of reliability due to a step between the anti-reflection film and the antenna may be prevented.

The anti-reflection film may overlap the antenna pad. Accordingly, the edge of the anti-reflection film may be sufficiently spaced apart from the border between the bezel area and the transmissive area of the electronic device. Advantageously, the edge of the anti-reflection film may be invisible to users of the electronic device.

The first and second adhesive layers may be disposed between the antenna and the display panel, and the dielectric constants and/or the loss values of the first and second adhesive layers may be adjusted to be different. Advantageously, physical properties for antenna characteristics may be more easily optimized.

The window may be disposed between the antenna and the display panel. The circuit film may be electrically connected with the antenna through the opening defined in the window. As the window is disposed between the antenna and the display panel, the distance between the antenna pattern and the ground may be increased. Advantageously, the performance of the antenna may be improved.

While examples of embodiments have been described, various changes and modifications may be made to the described embodiments without departing from the scope set forth in the following claims.

What is claimed is:

1. An electronic device comprising:
a display panel;
an antenna overlapping the display panel, wherein the antenna includes an antenna base film having a first surface and a second surface opposite to the first surface, wherein the first surface is disposed between the display panel and the second surface, wherein the antenna further includes an antenna pattern, an antenna feed line, and an antenna pad each being disposed on the first surface, and wherein the antenna pattern is electrically connected through the antenna feed line to the antenna pad; and
a circuit film electrically connected to the antenna pad, wherein the display panel is disposed closer to the first surface, on which each of the antenna pattern, the antenna feed line and the antenna pad is disposed, than the second surface.

2. The electronic device of claim 1, further comprising:
a first adhesive layer disposed between the display panel and the antenna; and
a second adhesive layer disposed between the first adhesive layer and the display panel,
wherein the first adhesive layer and the second adhesive layer are attached to each other.

3. The electronic device of claim 2, wherein a dielectric constant of the first adhesive layer is lower than a dielectric constant of the second adhesive layer.

4. The electronic device of claim 2, wherein a loss value of the first adhesive layer is lower than a loss value of the second adhesive layer.

5. The electronic device of claim 2, wherein the first adhesive layer covers a face of the antenna pattern, covers at least half of a face of the antenna feed line, and does not overlap the antenna pad in a direction perpendicular to the first surface,
wherein the second adhesive layer overlaps each of the antenna pattern, the antenna feed line, and the antenna pad in the direction perpendicular to the first surface, and
wherein the circuit film is partially disposed between a portion of the second adhesive layer and the antenna pad.

6. The electronic device of claim 2, wherein the first adhesive layer is shorter than the second adhesive layer in a direction parallel to the first surface.

7. The electronic device of claim 1, further comprising:
an anti-reflection film overlapping the antenna;
a window overlapping the anti-reflection film; and
a bezel pattern disposed on the window,
wherein the antenna pad overlaps the bezel pattern.

8. The electronic device of claim 7, wherein an edge of the antenna base film, an edge of the anti-reflection film, and an edge of the display panel are aligned with one another in a cross-sectional view of the electronic device.

9. The electronic device of claim 7, wherein the antenna base film protrudes beyond an edge of the anti-reflection film in a direction parallel to the first surface, and wherein the antenna pad does not overlap the anti-reflection film in a direction perpendicular to the first surface.

10. The electronic device of claim 7, wherein an edge of the antenna base film and an edge of the anti-reflection film are aligned with each other in a cross-sectional view of the electronic device,
wherein each of the antenna base film and the anti-reflection film protrude beyond an edge of the display panel in a direction parallel to the first surface, and
wherein the antenna pad and a portion of the anti-reflection film do not overlap the display panel in a direction perpendicular to the first surface.

11. An electronic device comprising:
a display panel;

an antenna overlapping the display panel, wherein the antenna includes an antenna base film having a first surface and a second surface opposite each other, wherein the first surface is disposed between the display panel and the second surface, wherein the antenna further includes an antenna pattern, an antenna feed line, and an antenna pad each being disposed on the first surface, and wherein the antenna pattern is electrically connected through the antenna feed line to the antenna pad;

a circuit film electrically connected to the antenna pad; and a window disposed between the antenna and the display panel.

12. The electronic device of claim 11, wherein the window has an opening that exposes the antenna pad.

13. The electronic device of claim 12, wherein the opening is completely surrounded by the window.

14. The electronic device of claim 12, wherein the opening is connected to an edge of the window and is partially surrounded by the window.

15. The electronic device of claim 12, further comprising:
a bezel pattern disposed closer to the second surface of the antenna base film than to the first surface of the antenna base film; and
a protective layer overlapping the antenna base film and covering at least one face of the bezel pattern.

16. The electronic device of claim 15, wherein the opening is overlapped by the bezel pattern.

17. The electronic device of claim 12, wherein the window includes a first portion including an edge of the window and includes a second portion spaced from the first portion by the opening, and
wherein the second portion is at least as thick as the first portion in a direction perpendicular to the first surface.

18. The electronic device of claim 17, wherein the first portion of the window overlaps the circuit film.

19. The electronic device of claim 12, further comprising:
an adhesive layer disposed between the window and the display panel,
wherein the adhesive layer overlaps the antenna pad, and
wherein a portion of the circuit film is disposed between the antenna pad and the adhesive layer.

20. The electronic device of claim 12, further comprising:
an adhesive layer disposed between the window and the display panel,
wherein the adhesive layer does not overlap the antenna pad in a direction perpendicular to the first surface, and
wherein an edge of the adhesive layer faces the circuit film.

21. The electronic device of claim 20, wherein the circuit film includes a bent portion disposed between the antenna and the display panel and facing the edge of the adhesive layer.

22. An electronic device comprising:
a display panel;
an antenna overlapping the display panel, the antenna including a first surface and a second surface positioned farther from the display panel than the first surface; and
a circuit film electrically connected to the antenna,
wherein a portion of the circuit film is disposed between the first surface of the antenna and the display panel.

23. The electronic device of claim 22, further comprising:
a first adhesive layer disposed between the first surface of the antenna and the display panel; and
a second adhesive layer directly attached to each of the first adhesive layer and the display panel.

24. The electronic device of claim 23, wherein at least one of a dielectric constant and a loss value of the first adhesive layer is lower than at least one of a dielectric constant and a loss value of the second adhesive layer.

25. The electronic device of claim 22, wherein an edge of the antenna is aligned with an edge of the display panel in a cross-sectional view of the electronic device, or a portion of the antenna protrudes beyond the edge of the display panel in a direction parallel to the first surface of the antenna, and wherein the edge of the antenna or the portion of the antenna overlaps the circuit film.

26. The electronic device of claim 22, further comprising:
an anti-reflection film overlapping the antenna; and
a window overlapping the anti-reflection film,
wherein an edge of the anti-reflection film is aligned with at least one of an edge of the display panel and an edge of the antenna in a cross-sectional view of the electronic device.

27. The electronic device of claim 22, further comprising:
a window disposed between the antenna and the display panel,
wherein the window has an opening that exposes a portion of the circuit film, and
wherein the circuit film is electrically connected to the antenna through the opening of the window.

28. The electronic device of claim 27, wherein the opening is completely surrounded by the window or is connected to an edge of the window and partially surrounded by the window.

29. The electronic device of claim 27, further comprising:
a bezel pattern overlapping the second surface of the antenna; and
a protective layer overlapping the antenna and covering at least one face of the bezel pattern,
wherein the opening is overlapped by the bezel pattern.

30. The electronic device of claim 27, wherein the window includes a first portion including an edge of the window and includes a second portion spaced from the first portion by the opening, wherein the second portion is at least as thick as the first portion in a direction perpendicular to the first surface, and wherein the first portion overlaps the circuit film.

31. The electronic device of claim 27, further comprising:
an adhesive layer disposed between the window and the display panel and overlapping the opening of the window, wherein a portion of the circuit film is disposed between a portion of the antenna exposed by the opening of the window and the adhesive layer.

32. The electronic device of claim 27, further comprising:
an adhesive layer disposed between the window and the display panel, wherein the circuit film includes a bent portion disposed between the antenna and the display panel, and wherein the bent portion faces an edge of the adhesive layer.

* * * * *